J. K. Mayo.

Materials for Bridges &c.

№ 3086 Reissued Aug. 18, 1868.

Witnesses
W. B. Deming
W. H. Brereton

Inventor
John K. Mayo
By Knight Bros
Attys

United States Patent Office.

JOHN K. MAYO, OF NEW YORK, N. Y., FOR HIMSELF, AND ANDRE CUSHING AND GEORGE B. CUSHING, OF ST. JOHN, NEW BRUNSWICK, ASSIGNEES OF JOHN K. MAYO.

*Letters Patent No.* 51,735, *dated December* 26, 1865; *reissue No.* 3,086, *dated August* 18, 1868.

DIVISION B.

IMPROVED MATERIAL TO BE USED IN CONSTRUCTING BRIDGES, ARCHES, BEAMS, TUNNELS, AND OTHER WORKS IN CIVIL ENGINEERING.

The Schedule referred to in these Letters Patent and making part of the same.

TO ALL WHOM IT MAY CONCERN:

Be it known that JOHN K. MAYO, formerly of Portland, Maine, but now of the city, county, and State of New York, invented an Improvement in Structures Used in Civil Engineering; and the following is hereby declared to be a sufficiently full, clear, and exact description thereof to enable one skilled in the art to which the said invention appertains to carry it into effect, reference being had to the accompanying drawings, which are made a part of this specification.

The invention consists in the formation of various structures used in civil engineering of a plurality of thin sheets or veneers of wood, cemented or otherwise firmly connected together, with the grain of the several scales or thicknesses crossed or diversified, so that they will afford to each other mutual strength, support, and protection against checking and splitting, shrinking or swelling, expanding or contracting.

In the drawings—

Figure 1 shows a perspective view of a tubular bridge.

Figure 2 represents a sectional perspective view of a rectangular tubular bridge.

Figure 3 represents a section of pavement.

Figures 4, 5:
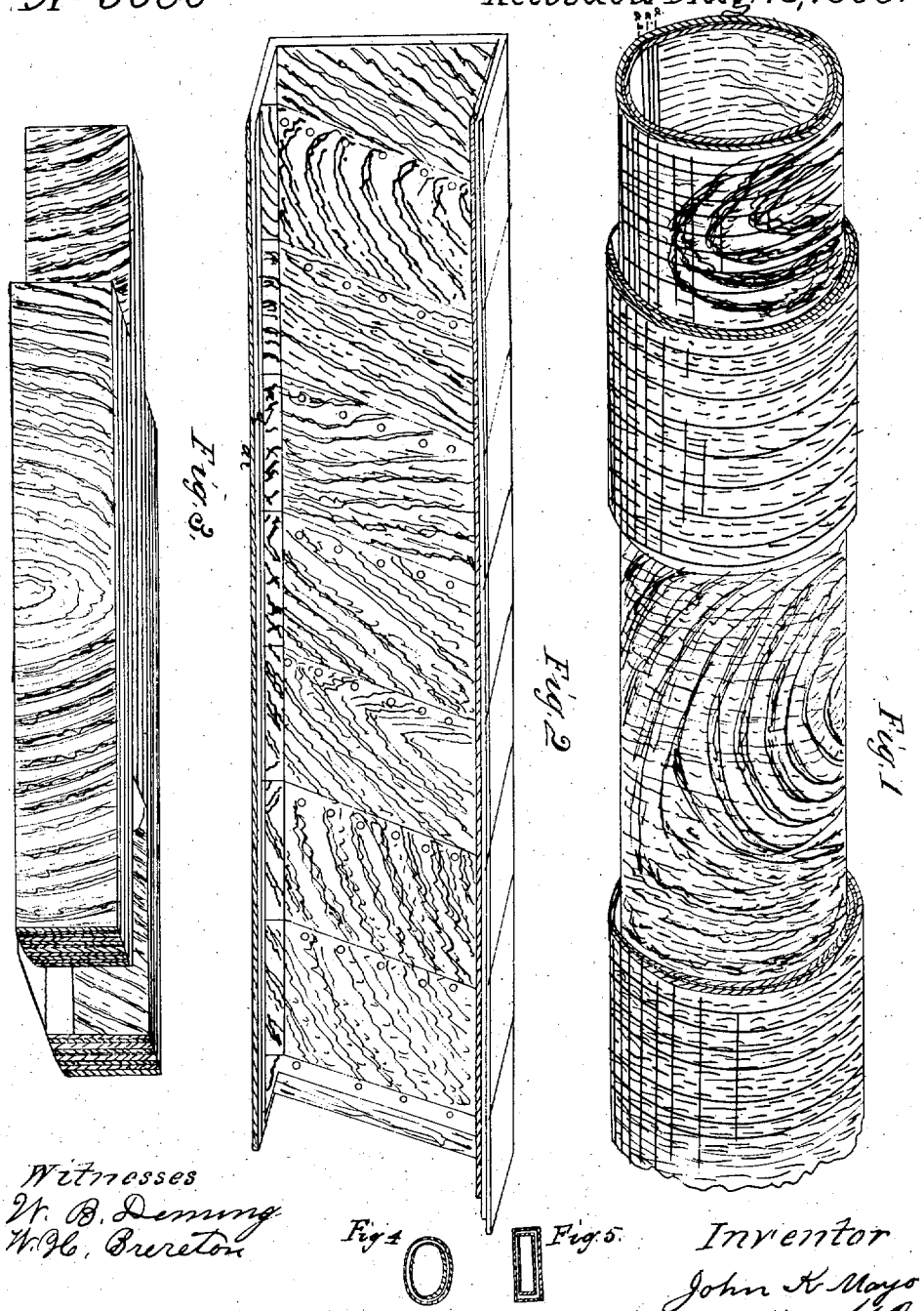
Figures 4 and 5 are transverse sections of portions of frames for a truss-bridge.

A is the floor of the bridge, constructed in layers *a a′ a″*, in which the grain of one layer is laid transversely or diagonally to the layer in contact with it, so that the whole will form a compact and water-tight floor, making a thorough protection for the framework beneath, and doing away with the necessity of a roof, being impervious to water, and connected from end to end, and constructed of materials which do not expand appreciably by heat or contract by cold.

The expansion of metal by heat forms the chief objection to the application of iron to buildings or bridges, and unavoidably keeps some portions under an otherwise unnecessary strain.

In this invention, the truss-work B of the bridge is made entirely of scale-board or laminated material, which is eminently fitted to such application, as being incorrodible, inexpansible, and impervious, as well as having very great tensional strength in all directions.

This material is peculiarly adapted to the construction of bridges of long span, where great strength and lightness are required, either in form of truss, arch, or tubular bridge. The tubular bridge may be built in sections, and united by faucet or sleeve-joints, in the usual manner, combined with riveting, where required, or they may be built in one length, by gradual extension in building up the tube. When made in spans over quiet waters, these tubes may be floated to their respective piers, and easily raised to position by the usual mechanical appliances, whereas it would be impossible to raise iron tubes or girders of equal strength.

In some instances it might be found expedient to form a large tube or tunnel, by combining a series of smaller tubes, giving greater facility of handling in the construction, and, at the same time, increased strength and stiffness.

In the construction of pavements, as shown in fig. 3, the blocks are made of compound scale-board, with the laminæ in vertical planes, so that the ends of a portion of the fibres will be presented upward. These serve to protect the horizontal fibres from wear, and the cement also serves to preserve the wood both from wear and decay.

In some instances the compound scale-board may be used to advantage, in connection with bridge-framing of common construction.

The invention is applicable to the formation of bridges of all kinds, or parts thereof, beams, girders, braces, arches, trusses, pavements, railroad-tracks, rails, chairs, splice-pieces, sleepers, ties, turn-tables, &c., tunnels, ladders, piers, piles and pile-coverings, docks, wharves, caissons, coffer-dams, break-waters, forts, turrets, fortifications, canal-locks and gates, sluices and their gates, aqueducts, mill-dams, sewers, pneumatic tubes for postal or railroad service, and other structures.

The foregoing are given merely as examples of the application of the laminated board or timbers to works of civil engineering, the applications being so numerous that it would be infeasible, and is unnecessary to explain them all, the principle of structure being similar in all.

The following is what is claimed as new, and desired to be secured by Letters Patent, as the invention of the said JOHN K. MAYO:

The employment or use of the compound scale-board hereinbefore described in the formation of the specified or analogous structures in civil engineering.

JOHN K. MAYO,

Witnesses:
EDWARD WILLARD,
S. W. FROST.